United States Patent
Meijer et al.

(10) Patent No.: US 7,930,577 B2
(45) Date of Patent: Apr. 19, 2011

(54) CLOSED-LOOP CONTROL FOR PERFORMANCE TUNING

(75) Inventors: Rinze Ida Mechtildis Peter Meijer, Herkenbosch (NL); Francesco Pessolano, Veldhoven (NL); Jose De Jesus Pineda De Gyvez, Eindhoven (NL)

(73) Assignee: ST-Ericsson SA, Geneva (CH)

( * ) Notice: Subject to any disclaimer, the term of this patent is extended or adjusted under 35 U.S.C. 154(b) by 817 days.

(21) Appl. No.: 11/629,716

(22) PCT Filed: Jun. 9, 2005

(86) PCT No.: PCT/IB2005/051894
§ 371 (c)(1),
(2), (4) Date: Nov. 5, 2007

(87) PCT Pub. No.: WO2005/124516
PCT Pub. Date: Dec. 29, 2005

(65) Prior Publication Data
US 2008/0106327 A1    May 8, 2008

(30) Foreign Application Priority Data
Jun. 15, 2004    (EP) .................................... 04102719

(51) Int. Cl.
*G06F 1/28*    (2006.01)
(52) U.S. Cl. ........................................ 713/340; 713/300
(58) Field of Classification Search .................. 713/300, 713/320, 323, 324, 340; 714/731, 814
See application file for complete search history.

(56) References Cited

U.S. PATENT DOCUMENTS

| | | | |
|---|---|---|---|
| 6,873,926 B1* | 3/2005 | Diab | 702/117 |
| 7,392,411 B2* | 6/2008 | Shakkarwar | 713/320 |
| 2003/0071657 A1* | 4/2003 | Soerensen et al. | 326/93 |
| 2004/0001357 A1* | 1/2004 | Pekny | 365/185.18 |
| 2004/0066208 A1* | 4/2004 | Liu et al. | 324/763 |
| 2004/0070464 A1* | 4/2004 | Wong et al. | 331/185 |
| 2005/0223251 A1* | 10/2005 | Liepe et al. | 713/322 |

FOREIGN PATENT DOCUMENTS

WO    WO 98/06022 A2    2/1998

OTHER PUBLICATIONS

Office Action dated Feb. 4, 2011 in connection with Japanese Patent Application No. 2007-516107.

* cited by examiner

*Primary Examiner* — Mark Connolly
*Assistant Examiner* — Paul B Yanchus, III

(57) ABSTRACT

The present invention relates to a method and circuit arrangement for controlling performance of an integrated circuit in response to a monitored performance indicator, wherein power supply of the integrated circuit is controlled based on said performance indicator. At least one of a noise level of the controlled power supply and a clock frequency generated in said integrated circuit is monitored and a respective control signal is fed back to the controlling function if the checking result is not within a predetermined range. Thereby, an simple and easily extendable automatic adaptation to process variations can be achieved.

20 Claims, 6 Drawing Sheets

CLOSED-LOOP CONTROL FOR PERFORMANCE TUNING

The present invention relates to a circuit arrangement and method for controlling performance of an integrated circuit (IC) in response to a monitored performance indicator. As an example, the invention may relate to integrated circuits which are subdivided into electrically isolated regions, where parameters such as supply voltage, clock frequency etc. of each island can be controlled individually.

The implementation of circuits and systems in new deep submicron technologies requires new ideas to make the system performance successfully feasible. It is clear that the performance of a system on chip (SoC) implemented in e.g. a 100 nm technology or beyond may severely be hampered by excessive transistor leakage, by the impact of local and global process variability, and by reduced noise margins. Therefore, strategies are being developed and used for solving this problem by means of regulating in real-time design parameters such as power supply and frequency of operation under constrained performance conditions. The objective of such an approach is to adapt a chip, e.g. an isolated region of the IC or an SoC, so that a certain level of performance is guaranteed in terms of both speed and power in a sub-optimal way.

FIG. 1 shows a schematic flow diagram indicating processing steps of a conventional performance control scheme, wherein the left portion of FIG. 1 corresponds to a software portion SW of the control scheme and the right portion of FIG. 1 corresponds to a hardware portion HW of the control scheme. The flow diagram gives an idea of how a system can be implemented for power management. A (software) application is profiled to generate information on required hardware performance for different sections or even instructions. This information is used to generate performance indicators that are included or incorporated in the application. The hardware extracts these performance indicators and uses them so as to determine the most suitable working conditions in terms of supply voltage and clock frequency. To be more precise, in step 10, the application is normally compiled by a standard compiler. Then in step 11, a standard profiler is used to extract a execution profile of the application which gives information on the behavior of the application and its performance requirements. Based on the execution profile obtained in step 11, the performance indicators can be extracted in step 12. Thus, step 12 depends on the hardware that is going to be used. In step 14, the performance indicators are incorporated into the application to obtain an augmented application. Then, in step 20 of the hardware section HW, the indicators are extracted from the application. This extraction depends on step 14. Then, in step 21a the application is executed and the performance is tuned depending on the indicators in step 21b.

Adaptive voltage supply has been proposed to be used for different functional regions on a single chip. In this way, the supply voltage of those regions can be optimized individually, and thereby allowing further performance optimization. As an example, Nowka et al. describe in 'A 32-bit PowerPC system-on-a-chip with support for dynamic voltage scaling and dynamic frequency scaling', IEEE Journal of Solid-State Circuits, November 2002, Vol. 37, No. 11, pages 1441-1447 a system-on-a-chip processor which makes use of dynamic voltage scaling and on-the-fly frequency scaling to adapt to the dynamically changing performance demands. The SoC makes use of active power reduction techniques to dynamically match the power consumption with the requirements of the application. Active power consumption is reduced when resources demands are low through the use of dynamic voltage scaling, dynamic frequency scaling, unit and register level functional clock gating. To support dynamic voltage scaling in this SoC, the power distribution has been divided into four distinct power domains of which two domains are voltage controlled.

Additionally, Miyazaki et al. describe an autonomous and decentralize system in 'An autonomous decentralized low-power system with adaptive-universal control for a chip multi-processor', IEEE International Solid State Circuits Conference, Digest of Technical Papers, San Francisco, USA, 8-13 Feb. 2003, pages 108-109, where each processor can operate at a minimum power consumption while maintaining specified performance. The power supply and clock are supplied to each module by global-routing lines, and each module is equipped which a voltage regulator and clock divider. A self-instructed look-up table in each module determines the voltages and frequency applied to the respective module. A compound built-in self test unit measures the performance of each module during the initial chip-testing phase and sends the data to each look-up table for memorization and use.

However, the above systems require sophisticated adaptation and power conversion circuits which increase area overhead and processing requirements. In general, the known schemes implementing the above performance tuning approach are complex and bulky in terms of required circuitry and monitoring.

It is therefore an object of the present invention to provide a simple adaptive control scheme with low area overhead for independent control of power supply to electrically isolated islands of an integrated circuit.

This object is achieved by a circuit arrangement as claimed in claim 1 and by a control method as claimed in claim 19.

Accordingly, a very simple and easily extendable automatic control scheme for performance control is provided where the process variations are adapted based on their implications on associated performance parameters. If the proposed system is provided in a decentralized manner for individual isolated regions of the integrated circuit, the use of variable resistor means for adjusting the individual power supply provides the advantage of low area overhead compared to the known solutions which require DC-DC converters and other dedicated circuits, and enables simple digital control and fast transient response. Furthermore, no additional external components are required as in the case of DC-DC converters. Thereby, transition to a desired state of performance can be achieved by controlling the power supply, e.g. changing the supply voltage.

The monitoring means may comprise power-supply-noise monitor means for checking if the noise on the power supply voltage exceeds a predetermined maximum value. Additionally or alternatively, the monitoring means may comprise clock comparing means for comparing a clock pulse with a reference pulse which is synchronous to a clock pulse of a predetermined delay. Specifically, the monitoring means may further comprise delay means for delaying the reference pulse by a predetermined time period associated with a worst case path delay. The monitoring means thus serve to ascertain that the power supply can be controlled as desired.

Furthermore, the performance control means may comprise a finite state machine which stores information about the current system state and controls transition to a state corresponding to the received performance indicator. Thereby, a simple structure and integration of the control system can be provided. As a specific example, the performance control means may comprise suppression means for suppressing state transition in response to the receipt of the respective control signal. This measure assures that (further) changes of the power supply are stopped or suppressed if the change is detrimental to the performance of the integrated circuit.

The performance control means may operate at nominal power supply, while the monitoring means may operate at the controlled power supply. To avoid level misinterpretations, shifting means can be provided for shifting the level of the respective control signal and for supplying the level-shifted control signal to the performance monitoring means at an appropriately adapted level.

As an additional measure, the performance control means may be arranged to control a back-bias voltage of the integrated circuit. Thereby, the flexibility of the control system can be further enhanced. In particular, performance of the isolated circuit regions can be individually controlled by properly biasing the bulk terminal of the transistors to change their threshold voltage.

The adjusted power supply may be forwarded to a clock generating means to individually adjust a clock supplied to the at least two electrically isolated circuit regions. The clock generating means can thus be placed in the autonomous island whose power supply is controlled by the local control means.

Furthermore, the performance control means may be arranged to control a bypass means to skip at least one register means of a processing pipeline of the at least two isolated circuit regions. Thus, another or additional method of controlling the performance of the integrated circuit can be provided to achieve an efficient configuration.

The variable resistor means may comprise transistor means divided into a plurality of transistor segments each segment or subset of segments being connected to a bit of a dedicated control register which is set by the performance control means. A discrete digital control of the resistance value can thus be introduced, wherein the control register can be easily programmed or reprogrammed at runtime to enable adaptive supply voltage control. Furthermore, the control shift register means may be connected to a clock generator means for supplying an adjusted clock signal to the isolated circuit regions, wherein the shift register means may be controlled based on a binary control signal supplied from the local control means, and wherein the binary control signal defines at least one binary value shifted into the shift register means so as to either increase or decrease the performance of the integrated circuit. This solution provides the advantage that performance of the integrated circuit can be easily controlled based on at last one simple binary control scheme or signal. In particular, the bit values of the shift register means may be used to individually bypass delay sections of the clock generator means. The frequency of the clock generator means can thus be directly controlled based on the bit values shifted into the shift register means.

As another option, the performance control means may be arranged to select a predetermined profile mode from a plurality of profile modes, each profile mode defining a predetermined relationship between a set of performance parameters of the isolated circuit region. Thus, the selected profile mode ensures that physical variables or performance parameters are modified continuously so as to meet the specified performance. In particular, specific ones of the parameters can be tied to other parameters, to thereby provide a coupling between individual parameters. In particular, the performance parameters may comprise a clock frequency, a power supply voltage and a threshold voltage. The predetermined profile mode and the performance parameters may be stored in a look-up table. Furthermore, the plurality of profile modes may comprise a profile mode in which the power supply voltage and the clock frequency are maintained at a fixed relationship.

Further advantageous modifications are defined in the dependent claims.

In the following, the present invention will be described on the basis of preferred embodiments with reference to the accompanying drawings in which.

The preferred embodiments will now be described on the basis of an IC which may be partitioned into different islands. Each island can be contained in an isolated third well of a triple well CMOS (Complementary Metal Oxide Semiconductor) technology. Triple well CMOS technology allows a well of a first type, e.g. a P-well, to be placed inside a well of a second type, e.g. an N-well, resulting in three kinds of well structures: simple wells of the first type, simple wells of the second type, and wells of a third type, consisting of a well of the first type inside a deep well of the second type. The third type of well is useful for isolating circuitry within it from other sections on the chip by a reverse bias between the deep well of the second type and the substrate. Each well can be controlled and its working conditions can be modified depending on some parameters. The remainder of the chip can be controlled as well, depending on other parameters. Each island is operating at one or more utility values, and at least one utility value of a first island can be different from a corresponding utility value of a second island.

Figure 1:
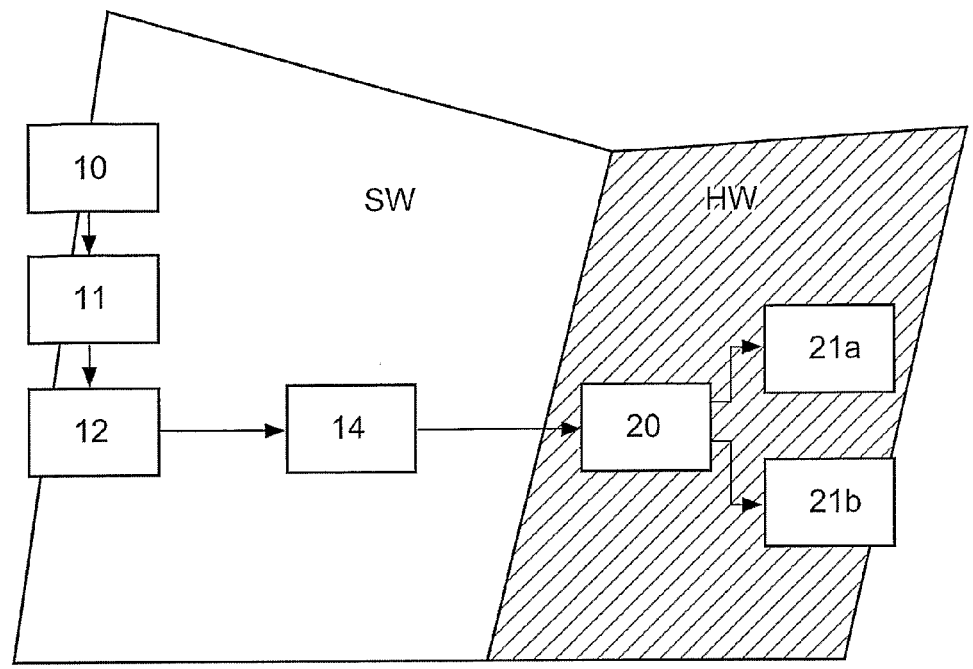
FIG. 1 shows a schematic flow diagram indicating processing steps of a conventional performance control scheme.
Figure 2:
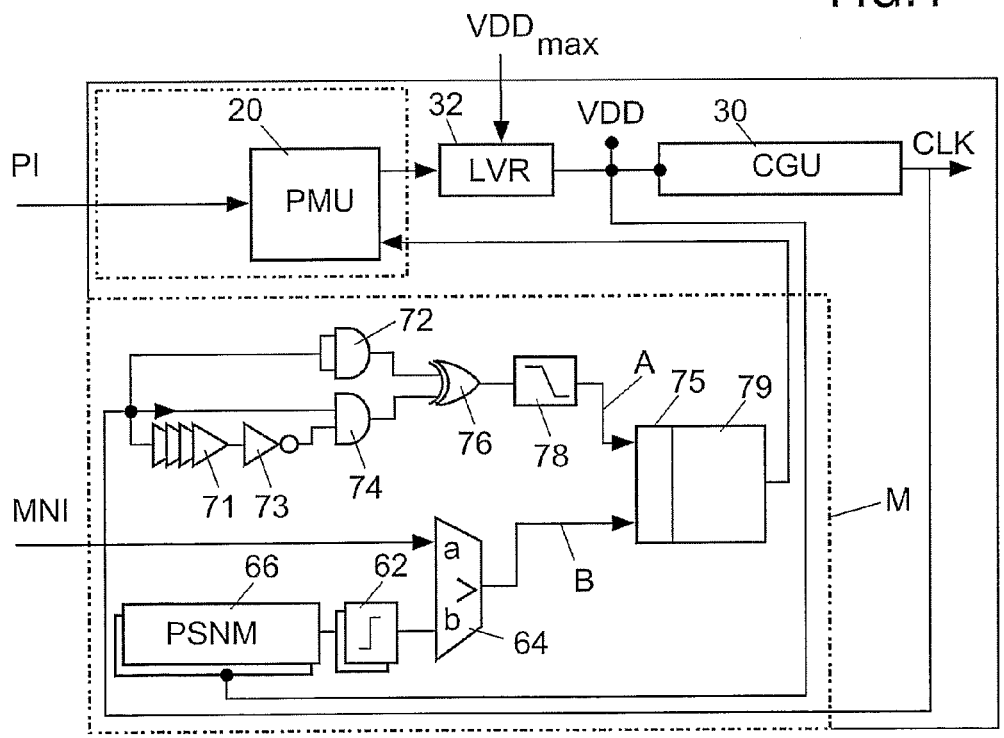
FIG. 2 shows a schematic block diagram a performance control circuit arrangement according to a first preferred embodiment.

FIG. 2 shows a schematic circuit diagram of a performance control circuit arrangement according to the first preferred embodiment, where a circuitry in CMOS technology or another integration technology is provided on an IC or a dedicated island of an IC and is connected via linear variable resistor (LVR) 32 to a power supply voltage terminal which supplies a global or nominal supply voltage $V_{DDmax}$. The integrated circuit is provided with a monitoring function or unit M for monitoring a clock frequency of a clock CLK generated locally on-chip by a clock generation unit (CGU) 30 and a local power management unit (PMU) 20 for locally controlling or tuning the performance of the IC or the dedicated island by suitably changing the supply voltage $V_{DD}$ based on a performance indicator PI supplied to the PMU 20.

According to the first preferred embodiment, a supply voltage and clock frequency control is performed for the IC, the dedicated island or a group of dedicated islands. The PI, which can be of any form such as coded or non-coded binary control word, binary address for addressing a memory or look-up table, or analog signal, is provided to the PMU 20. The PMU 20 may simply consist of a finite state machine (FSM) which knows or has stored the current system state and regulates or controls the transition to a state corresponding to, associated with, or allocated to the supplied PI. The state transition takes place by changing in steps or any other form of change the supply voltage $V_{DD}$ by means of the LVR 32. The controlled supply voltage $V_{DD}$ is also supplied to the CGU 30, which in turn changes also the clock frequency of the system accordingly.

In order to ascertain that the change of the supply voltage has no detrimental effect on the performance of the IC or dedicated island two control functions are provided in the monitoring unit M as control loops. The first control loop is responsible for noise control and comprises at least one power supply noise monitor (PSNM) 66 which serves to check if the noise on the controlled supply voltage $V_{DD}$ obtained from the LVR 32 exceeds a predetermined maximum tolerated value. The checking result is signaled, e.g. as a binary value, by means of a pulse on a respective noise control signal B. In the example of FIG. 2, this is achieved by generating a digital noise level signal at the PSNM 66 (or parallel stages thereof) and supplying this noise level signal via at least one signal forming unit 62 having a limiting and/or pulse shaping and/or other signal forming capability, to a noise comparing unit 64 which compares the noise level signal with a externally supplied maximum noise index (MNI) indicating the allowable maximum noise. Based on the comparison result, a pulse of a logical high level "1" is generated as the noise control signal B at the output of the noise comparing unit 64 to indicated existence of excessive noise, or vice versa.

The second control loop is responsible for clock control and is adapted to check whether the controlled clock frequency supplied by the CGU 30 is slow enough to enable correct performance or work of the system. This is achieved by means of a clock comparing function which compares a clock-high pulse with a reference pulse synchronous to a clock pulse having a delay equal to half of the worst-case path delay in the system. In the example of FIG. 2, this reference pulse is generated by supplying the clock CLK of the CGU 30 to a delay path consisting of several buffer or amplifier circuits 71 and an inverter circuit 73. The delayed and inverted clock signal is then applied to one terminal of a logical AND gate 74, while the other terminal receives the unmodified clock signal CLK. The output signal of the AND gate 74 corresponds to the reference pulse having a pulse length corresponding to the overlapping portions of the modified and unmodified clock signals and thus to the delay time introduced by the delay path. The clock comparison can be achieved by providing a simple logical XOR gate 76 to which the reference pulse is applied at one terminal and the unmodified clock signal CLK is applied via a second AND gate 72 serving as a delay matching unit to the other terminal. The output signal of the XOR gate 76 is on a high level if the two input signals have the same logical level. A subsequent low-pass filter 78 is used to eliminate spurious pulses. A pulse A is thus generated if the clock frequency generated by the CGU 30 is too high in view of the worst-case path delay.

The pulses or control signals A and B are supplied via a voltage shifting unit 75 for voltage level adjustment and a mutual exclusion unit 79 which is used for forwarding only one of the control signals A and B if both are active and which could alternatively be replaced by an OR gate to the PMU 20, so as to stop or suppress any further change operation of the supply voltage $V_{DD}$. The voltage shifting unit or units 75 are required due to the fact that the PMU 20 operates at the nominal supply voltage $V_{DDmax}$ (as indicated by the upper left dotted frame), while the remaining part of the circuitry operates at the controlled supply voltage VDD (as indicated by the other dotted frame).

Figure 3:
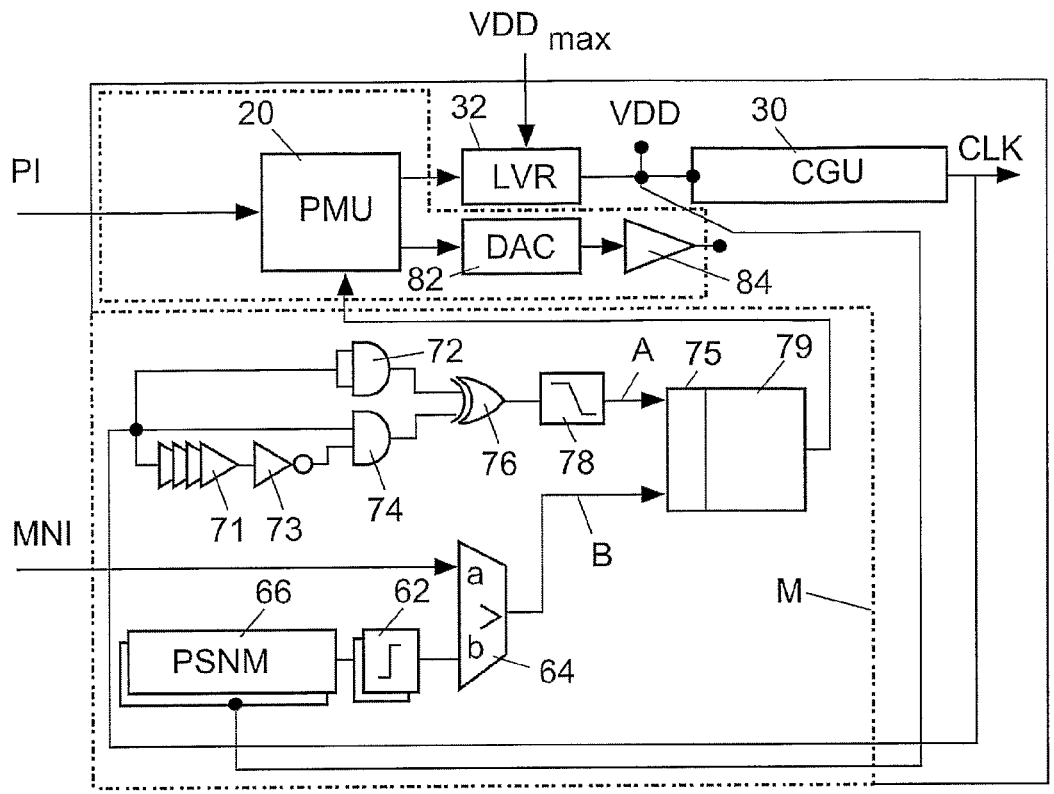
FIG. 3 shows a schematic block diagram of a performance control circuit arrangement according to a second preferred embodiment.

FIG. 3 shows a schematic circuit diagram of a performance control circuit arrangement according to the second preferred embodiment, which is similar to the first preferred embodiment, except for the provision of a control function for controlling back biasing or body biasing. To achieve this, a digital biasing control signal is generated by the PMU 20 based on the PI and is supplied to a digital-to-analog converter (DAC) 82. The equivalent analog signal generated by the DAC 82 is supplied to the IC substrate via an amplifier or buffer circuit 84. It is noted that the elements of the biasing control function, i.e. the DAC 82 and the buffer circuit 84 also operate at the nominal supply voltage $V_{DDmax}$ (as indicated by the enlarged dotted frame on the upper left side of FIG. 3). The effect of the controlled bias voltage is also captured by the control loops of the monitoring unit M, so that no additional monitoring function or control loop is necessary. The body bias can be generated in any way and has no major impact on the proposed performance control scheme.

In the above first and second embodiment, the LVR 32 acts as an actuator provided to control the power supply voltage $V_{DD}$. The controlled supply voltage $V_{DD}$ can vary in a wide range between 0 and $V_{DD}$ Volts as a function of the PI. The variable resistor may be implemented based on any semiconductor circuit or other circuit having a controllable resistor functionality or acting as a controllable resistance. As an alternative to the LVR 32, any generic voltage regulator, e.g. DC/DC converter, could be used as well.

In the following, a third preferred embodiment is described, where the PMU 20 is adapted to change the pipeline depth of at least one processing function provided in the controlled circuit.

Modern processors use pipelines to serialize and optimize the instruction execution to improve their performance. However, it is well known, that the optimal pipeline depth depends on a running application or even its current section. Therefore, it is proposed to allow the PMU 20 to modify the pipeline depth of a processing stage or function of the controlled circuit by means of merging or skipping some pipeline stages, which will also result in the necessity to alter the operating or clock frequency. Hence, the pipeline depth can be chosen individually for each island to optimize performance, e.g. multimedia applications require a maximum pipeline depth, while real-time applications might use an intermediate pipeline depth, etc. Any pipeline would benefit from this approach, while, however a balanced pipeline where the logic between two register banks have similar delays would benefit the most.

Figure 4:
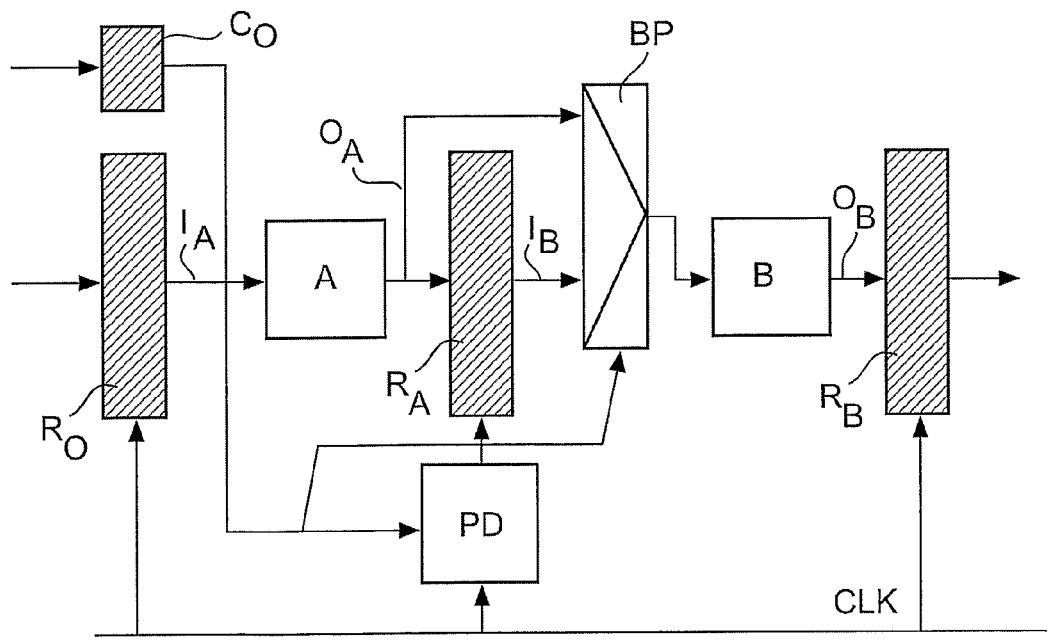
FIG. 4 shows a schematic block diagram indicating a variable-depth pipeline configuration according to the third preferred embodiment.

FIG. 4 shows a variable-depth pipeline according to the third preferred embodiment where two operations A and B are performed in respective processing or logical units. If an intermediate register $R_A$ can be skipped, the operations A, B can be executed in one clock cycle and the pipeline depth could be effectively changed to two. To achieve this, an extra logic PD (Pipeline Disable) is added, which allows to gate the clock of the intermediate register $R_A$. Furthermore, a bypass unit BP, which may be a multiplexer or other selective switching circuit, is added to select the appropriate input to the logic or operation B. By adding these structures to every register barrier, the pipeline depth can be altered completely.

There can be many ways by which an application or the PMU 20 could try and change the pipeline depth. One way is to specify a pipeline profile which defines which register barrier should be skipped and the necessary operating frequency to be set by the above μ-control function. The enabling and disabling of the pipeline stage may as well be based on corresponding instructions of a software routine.

In example shown in FIG. 4, the pipeline comprises the operation A followed by the register $R_A$ and the operation B followed by a register $R_B$. While the operation A computes the output value $O_A$ based on the input value $I_A$, the operation B computes the output value $O_B$ based on the input value $I_B$. The input value $I_B$ is the outcome of the operation A in the previous clock cycle.

A disadvantage of the pipelined operation is that latency increases. The clock period T supplied to the pipeline has to be adapted to the longest delay time occurring in the chain. Thus, the latency with which the output value $O_B$ is available can be expressed as $T+\tau_B$, which is usually longer than $\tau_A+\tau_B$, wherein $\tau_A$ and $\tau_B$ are the latencies for the operations A and B, respectively.

In the second preferred embodiment, the PMU 20 controls the bypass unit B to enable the skipping of one or more registers in the pipeline. Skipping a register can be advantageous if the operations in the pipeline only have to be performed incidentally. The control can be performed by setting a control value into a control latch or flipflop $C_0$, while the input value $I_A$ is supplied to an input register $R_0$. Thus, the latency can be shortened which has a relevant effect on the throughput of the pipeline. This throughput corresponds to the number of instructions which can be carried out in a certain time period. While skipping one or more register stages, the latency is reduced but the throughput is lowered, because a waiting time must be introduced until a new input value can be processed in both stages.

Next, a modified supply voltage actuator (which can replace the LVR 32 of FIGS. 2 and 3) for combined control of clock frequency and supply voltage is described in connection with a fourth preferred embodiment. In particular, a modified actuator tuning function enables easy control of the performance of the controlled circuit of FIGS. 2 and 3.

When the performance demand is low, the power supply can be lowered, delivering reduced performance but with a substantial power reduction. For high performance demands, the highest supply voltage delivers the highest performance at the fastest designed frequency of operation. Furthermore, such an approach can be used for tracking process and temperature variations. All schemes which have so far implemented this approach are based on receiving one or more performance indicators, which normally correspond to the desired clock frequency and supply voltage provided to the controlled system. The intelligence behind the manipulation of electrical parameters like power supply and operating frequency are thus arranged externally from the controlled circuit.

The basic idea of the actuator according to the fourth preferred embodiment is to replace the philosophy of given performance indication by simply requesting for more or less performance. This can be accomplished with a binary signal, i.e. at most two bit values, and leads to a very simplified implementation based on a shift register or first-in-first-out (FIFO) memory, a variable resistor used to generate the controlled supply voltage for the controlled circuit, and a linearly programmable clock generator, e.g., the CGU 30 in FIGS. 2 and 3.

Figure 5:
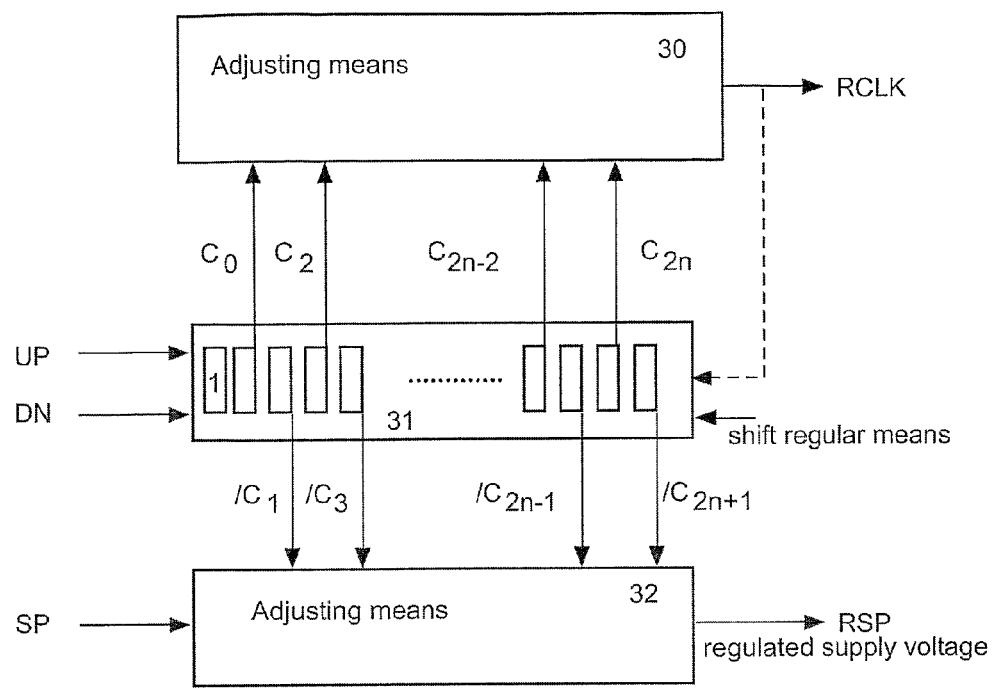
FIG. 5 shows a schematic flow diagram of a four-dimensional control scheme according to the fourth preferred embodiment.

FIG. 5 shows a generic implementation of this control scheme. Binary control signals UP and DN are provided by the PMU 20 and indicate whether more or less performance is required. Both signals control the FIFO or shift register 31 and are used as push or pop signals. Alternatively, a single binary control signal could be used, which is supplied and split into a non-inverted and inverted version to obtain the UP and DN values.

The bits stored in the shift register 31 are sent to a variable resistor 32 and to the CGU 30. In response thereto, the CGU 30 generates a regulated clock RCLK, and the variable resistor 32 generates a regulated supply voltage RSP.

Figure 6:
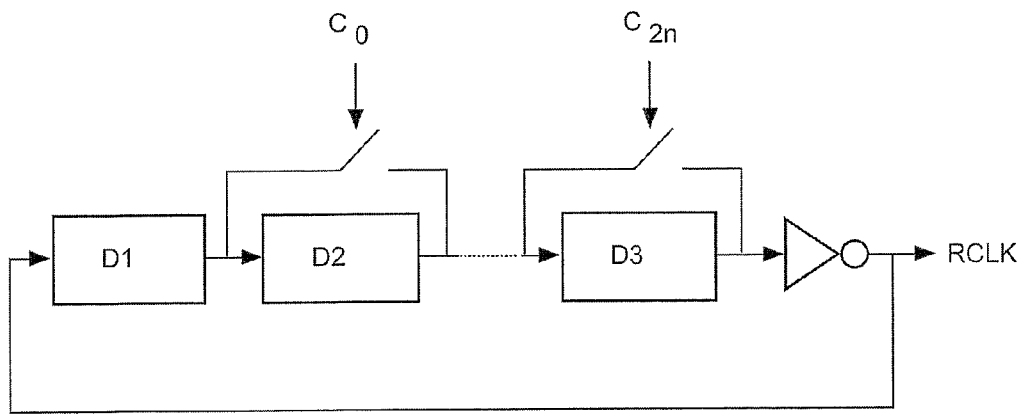
FIG. 6 shows a schematic circuit diagram of a linearly programmable clock generator according to a fourth preferred embodiment.

FIG. 6 shows a schematic circuit diagram of an example of the CGU 30. According to FIG. 6, the CGU 30 consists of a loop comprising an inverter and a plurality of delay sections D1 to D3 which can be bypassed based on control signals $C_0$, $C_2$, ..., $C_{2n}$ derived from the respective even bit positions of the shift register 31. Due to the fact that the total delay of the loop of the CGU 30 determines the regulated clock frequency RCLK, the clock frequency can be controlled based on the bit values stored in the shift register 31.

Figure 7:
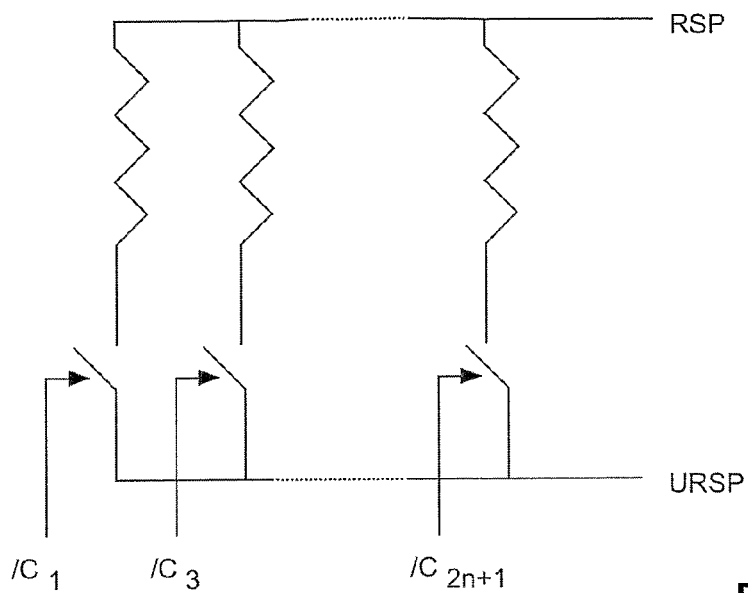
FIG. 7 shows a schematic circuit diagram of a controllable parallel variable resistor according to the fourth preferred embodiment.

FIG. 7 shows a schematic circuit diagram of an example of the LVR 32 connected between a regulated supply terminal RSP and an unregulated supply terminal URSP. The LVR 32 comprises a plurality of parallel resistor branches which can be individually switched based on control signals $/C_1$, $/C_3$, ..., $/C_{2n+1}$ obtained from an inversion or negation of the respective odd bit positions of the shift register 31. Of course, the controllable resistor circuit of FIG. 7 could be replaced by transistor segments, wherein the control signals are supplied to the control terminals of the transistor segments.

While increasing the number of logical '1' values in the pattern, the total delay of the CGU 30 is increased (as the number of active delay sections is reduced in FIG. 6) and the total resistance of the LVR 32 is reduced (as the number of open resistor branches in FIG. 7 increases).

The control scheme works as follows:

Initially, the shift register 31 will have a logical '1' at its first bit position or slot and the remaining bit positions or slots are filled with logical '0', which results in a pattern '100 . . . 000'. This ensures that the variable resistor is at its minimum value (all resistor branches are connected or closed) and the CGU 30 provides the fastest clock corresponding to the lowest total delay (only one delay section D1 is active), which is however an arbitrary choice. When the PMU 20 enables the control signal DN, the number of slots containing logical '1' is increased by shifting a logical '1' into the shift register 31 (shift to the right in FIG. 7) to obtain a pattern '110 . . . 000'. Depending on the new slot which is set by the shift operation, i.e. odd or even slot, either the supply voltage or the clock frequency is reduced. On the other hand, when the PMU 20 enables the control signal UP, the number of slots containing '1' is decreased by removing a logical '1' from the shift register 31 (shift to the left in FIG. 5) to obtain the pattern '100 . . . 000'. Depending on which slot is reset, i.e. odd or even slot, either the supply voltage or the clock frequency is reduced.

The sequence of actions is such that the clock frequency is reduced always before the supply voltage and the supply voltage is always increased before the clock frequency. In the proposed control scheme, rising (and of course releasing) the control signals UP and DN causes only one change in the state of the shift register 31. It could be also possible to feed the shift register 31 with the generated clock RCLK, as indicated by the dotted line in FIG. 5, so that a plurality of slots are set or reset as long as the control signal UP or DN is kept high.

The controlled circuit operates at its maximum performance when the shift register 31 is filled only with logical '0', while largest power savings are obtained in case the shift register 31 is filled only with logical '1'. Since the PMU 20 controls the CGU 30, it knows a clock frequency or operating frequency for a given data word of the shift register 31. On the other hand, a performance monitor, e.g. a ring oscillator and a counter, can be used to perform real-time measurements of the performance of the controlled circuit.

Figure 8:
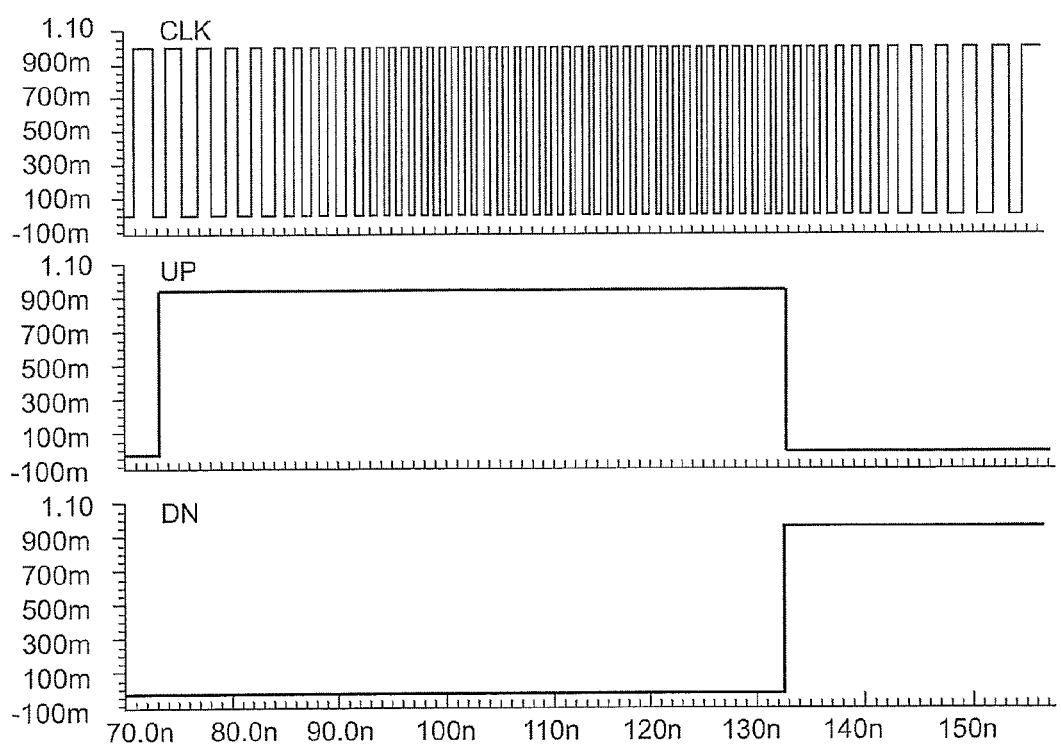
FIG. 8 shows a signaling diagram indicating an example of a clock waveform used in the preferred embodiments.

FIG. 8 shows signal diagrams indicating, from the top to the bottom, waveforms of the regulated clock signal RCLK, the control signal UP and the control signal DN. As can be gathered from FIG. 8, the regulated clock signal RCLK increases in frequency when the control signal UP is on a high logical state, while the regulated clock signal RCLK decreases in frequency, when the control signal DN is in a high logical state.

Figure 9:
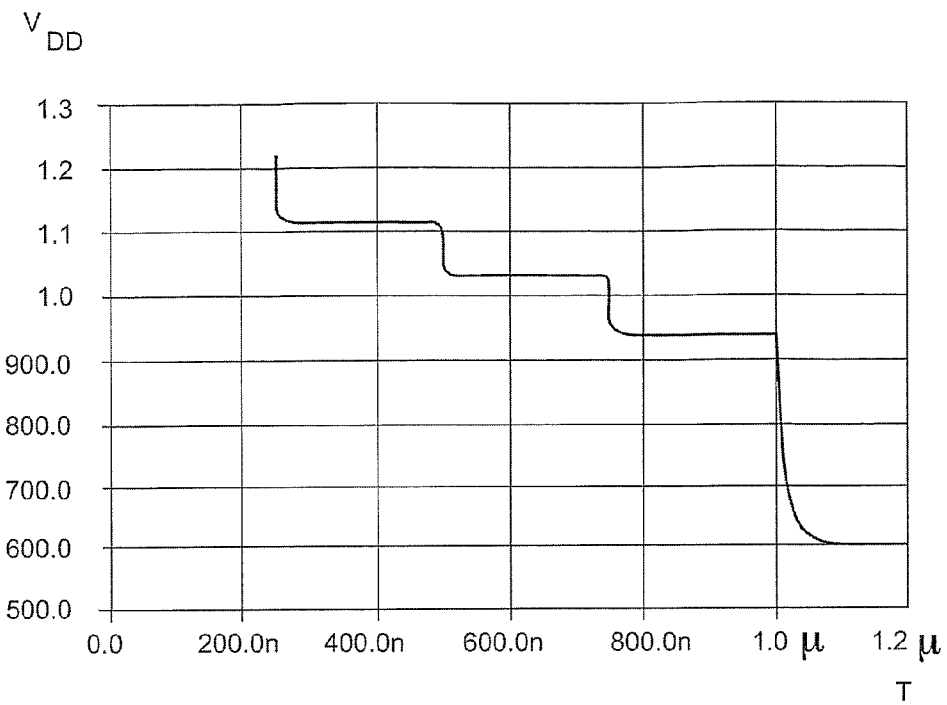
FIG. 9 shows a signaling diagram indicating an example of a supply voltage in the fourth preferred embodiment.

FIG. 9 shows a signal diagram indicating a waveform of the regulated supply voltage RSP or $V_{DD}$ over time, where a stepwise voltage decrease based on a corresponding change of the content of the shift register 31 can be observed.

Figure 10:
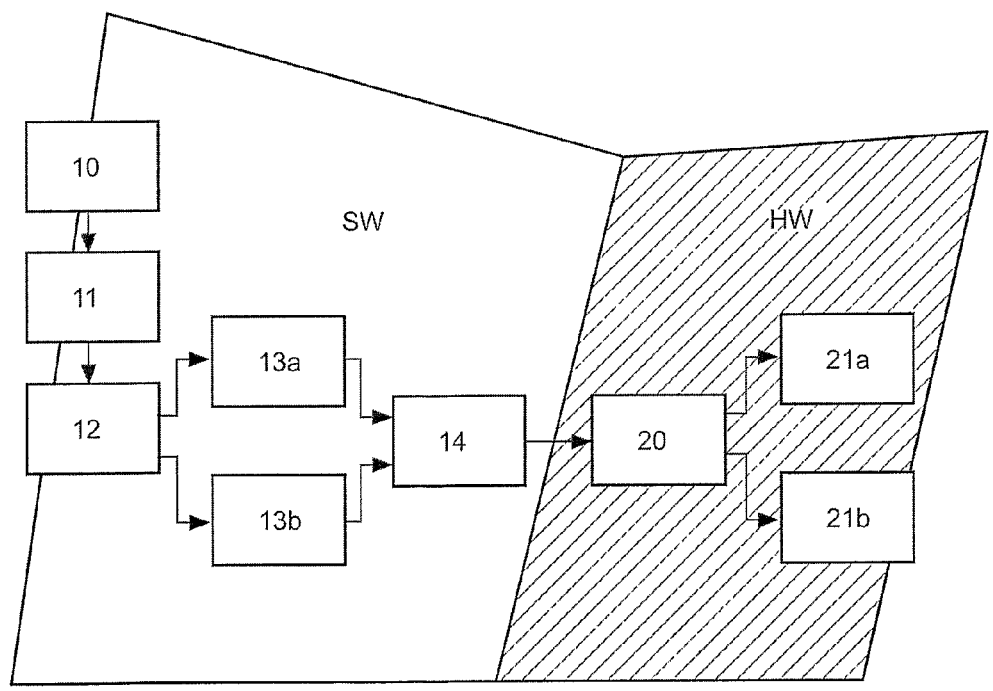
FIG. 10 shows a schematic flow diagram of a control function according to the fifth preferred embodiment.

FIG. 10 shows a schematic flow diagram indicating processing steps of a proposed control scheme according to the fourth preferred embodiment, wherein the left portion of FIG. 10 again corresponds to a software portion SW of the control scheme and the right portion of FIG. 10 again corresponds to a hardware portion HW of the control scheme.

In step 10, the application is normally compiled by a standard compiler. Then in step 11, a standard profiler is used to extract a statistical profile of the application which gives information on the behavior of the application and its performance requirements. Based on the statistic profile obtained in step 11, the performance indicators can be extracted in step 12. Thus, step 12 depends on the hardware that is going to be used. For the proposed solution, this assumption is not necessary and an indicator could only express the performance requirement of a section of the application in comparison with one of the other sections.

In step 13, the indicators or control values UP and DN are extracted in respective partial steps 13a and 13b. This extraction can be done independently from the hardware or tuned to the hardware, e.g. tuned to a specific initial guaranteed performance on which the control signals UP and DN are referenced to. In step 14, the control values UP and DN are embedded in the application as a two-bit or one-bit field for each instruction, for a fixed or variable application section or as a separate program. As already mentioned above, the UP and DN control values may as well be derived from a single binary control value or bit, wherein a first state of the single control bit relates to a high value of the control signal UP and a second state of the control bit relates to a high value of the control signal DN.

In step 20 of the hardware section HW, the control values UP and DN are extracted from the application. This extraction depends on step 14. Then, in step 21 the application is executed and the hardware is tuned depending on the control values UP and DN in respective partial steps 21a and 21b.

Next, a fifth preferred embodiment is described, which relates to a control scheme for controlling supply voltage, clock frequency and body-bias of a controlled circuit. In particular, the fifth preferred embodiment relates to a very simple autonomous scheme where a performance indicator is supplied and the three physical variables clock frequency, voltage supply and body-bias are modified accordingly and continuously so as to meet the specified performance. One advantage of this fifth preferred embodiment is that the clock frequency is tied to the supply voltage. In other words, scaling the supply voltage $V_{DD}$ up and down results in a corresponding change of the clock frequency. This aspect is important in autonomous islands of performance (AIoP) due to the fact that the speed of the circuit and clock are made to match a proper scaling of the power supply.

From a system standpoint, the AIoP approach aims at developing key circuit design technologies for future IP platforms and assumes that the SoC is composed of islands. Essentially, the AIoP technology provides the hardware infrastructure, referred to as AIoP shell, to adapt the performance of an island or clusters of islands, such that a certain level of performance is guaranteed in terms of both speed and power. The AIoP technology selects the islands optimum power supply and threshold voltage for a given desired performance in terms of speed and/or power consumption.

Figure 11:
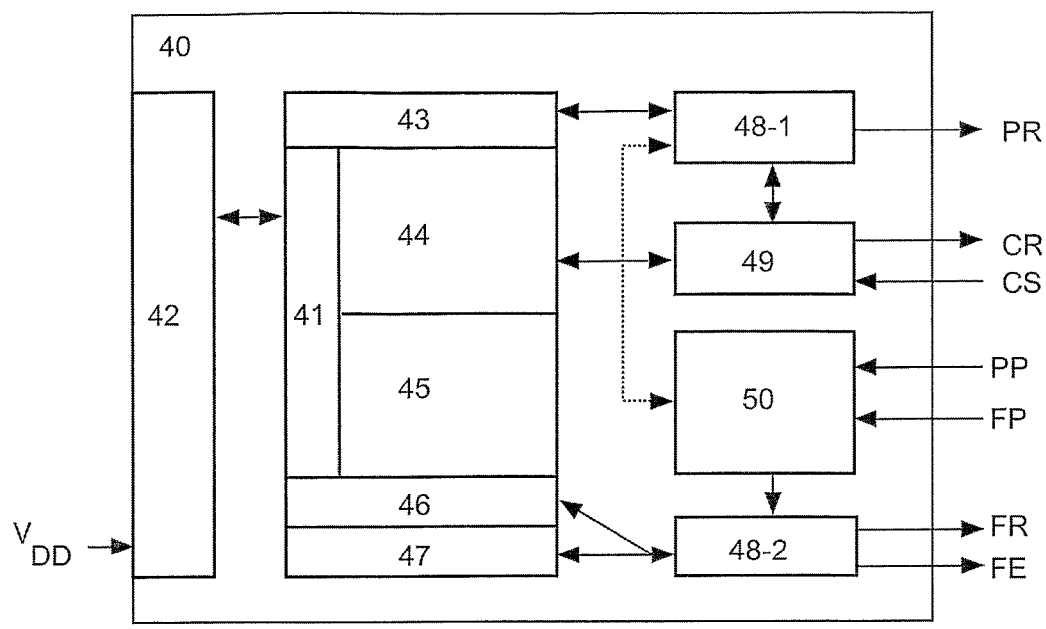
FIG. 11 shows a schematic block diagram of an AIoP shell interface according to the fifth preferred embodiment.

FIG. 11 shows a schematic block diagram of a AIoP shell which input consists of a profile mode and the islands target frequency. A calibration phase is also possible. The shell acknowledges all of the profile, frequency and calibration requests. The frequency (defined by a frequency pointer FP), profile mode (defined by a profile pointer PP) and power supply values $V_{DD}$ are kept in a look-up table (LUT) 50. AIoP controllers 48-1 and 48-2 and a calibration unit 49 make use of the LUT 50 for dynamic tuning of the island under control. Since islands can have distinct power supply voltages, level shifters 42 are needed to communicate with other islands.

The calibration unit 49 is controlled by a calibration start (CS) signal and generates a calibration ready (CR) signal. A threshold controller 48-1 generates a profile ready (PR) signal and a supply controller 48-2 generates a frequency ready (FR) signal and a frequency error (FE) signal. Furthermore, the AIoP shell which is provided on the island 40 includes a threshold monitoring unit 43 for monitoring the voltage threshold of the controlled circuit, a speed monitoring unit 47 for monitoring the circuit speed, and a PSN monitoring unit 46 for monitoring the power supply noise of the controlled circuit.

Furthermore, the island 40 which may be provided in an isolated third well of a triple well CMOS technology comprises an N-well region 44 and a P-well region 45 in which processing elements of the controlled circuit are arranged, and a clock generating region or functionality 41. These regions are monitored by the threshold monitor 43, the PSN monitor 46 and the speed monitor 47.

The AIoP shell of FIG. 11 offers the possibility of setting the AIoP island 40 in different profile modes. Generally, two profile modes can be distinguished, namely an active mode and a standby mode. In the active mode, the following profiles can be selected:

A high performance profile, in which the threshold voltages are brought to a minimum value and the power supply is paired or fixedly related to the required clock frequency.

A typical performance profile, in which threshold voltages are kept at their typical values and the power supply is paired or fixedly related to the required frequency.

A low power performance profile, in which the threshold voltages are brought to the maximum value and the power supply is paired or fixedly related to the required clock frequency.

On the other hand, in the standby mode, the following profiles can be selected:

A cool profile, in which a clock gating is applied, and the power supply is lowered to its minimum allowable value while the threshold voltages are risen to their maximum allowable voltage. This mode or profile can be used for low power purposes.

A cold profile, in which the same settings as in the cool profile are used, but the power supply is cut off from the combinational logic while retaining the circuit state of the flip flops, latches or the like. This mode or profile is suitable for low power low leakage needs.

A cryogenic profile, in which the entire island 40 is simply turned off.

The tuning scheme of the AIoP shell matches power-supply-voltage and clock pairs to a given profile mode which depends on a selection of the threshold voltage. Thus, a change in the power supply voltage is reflected by a change in the clock's frequency and circuit speed. An immediate consequence of this approach is that the frequency spectrum, for the island under consideration, bounds the supply voltage range to upper and lower limits. Due to the fact that power supply and clock are paired, the size of the power supply step determines also the frequency step of the clock.

Figure 12:
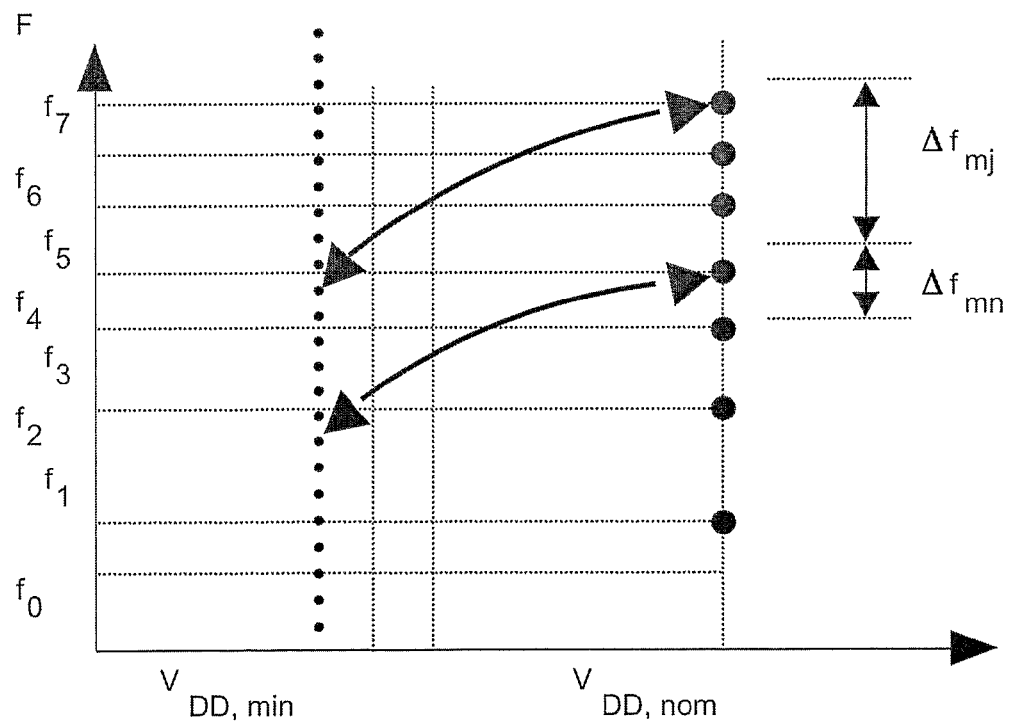
FIG. 12 shows a schematic diagram indicating a clock vs supply voltage pairing according to the fifth preferred embodiment.

FIG. 12 shows a frequency versus voltage diagram indicating a clock and supply voltage pairing used in obtaining programmable clock frequencies according to the fourth preferred embodiment.

The AIoP technology is using a programmable clock that can operate in such a way that frequency can be safely changed discretely, i.e. from any value to any other value, with predictable latency of one clock. This frequency step is referred to as major step Δfmj. In FIG. 12, the two arrows indicate a tuning relationship between a change of the supply voltage from a minimum supply voltage $V_{DD,min}$ to a nominal supply voltage $V_{DD,nom}$ and the corresponding major step $\Delta_{fmj}$. Once the clock is programmed, minor frequency steps $\Delta_{fmn}$ are obtained by scaling the power supply of the controlled circuit 10, as indicated by the dotted lines, and the clock can be made to match by a proper scaling of the power supply.

It is to be pointed out that the specific features of the above preferred embodiments can be combined or exchanged without departing from the scope of the present invention. In particular, the specific actuator according to the third preferred embodiment may replace the LVR 32 of the first and second preferred embodiments. Any kind of switching arrangement can be used for switching the transistor or resistor elements which form the LVR 32 shown in FIGS. 2 and 3. Moreover, the variable-depth control of the pipeline in FIG. 4 can be obtained by other switching and/or control arrangements suitable for bypassing at least one of the registers. The combined clock and noise control functions of the first and second preferred embodiments may by provided separately in respective own embodiments, where either only the clock frequency or only the power supply noise is monitored.

It is further noted that the present invention is not limited to the above preferred embodiments and can be varied within the scope of the attached claims. In particular, the described drawing figures are only schematic and are not limiting. In the drawings, the size of some of the elements may be exaggerated and not drawn on scale for illustrative purposes. Where the term 'comprising' is used in the present description and claims, it does not exclude other elements or steps. Where an indefinite or definite article is used when referring to a singular noun, e.g. 'a' or 'an', 'the', this includes a plural of that noun unless something else is specifically stated. The terms first, second, third and the like in the description and in the claims are used for distinguishing between similar elements and not necessarily for describing a sequential or chronological order. It is to be understood that the embodiments of the invention described herein are capable of operation in other sequences than described or illustrated herein. Moreover, although preferred embodiments, specific constructions and configurations have been discussed herein, various changes or modifications in form and detail may be made without departing from the scope of the attached claims.

The invention claimed is:

1. A circuit arrangement for controlling performance of an integrated circuit in response to a monitored performance indicator, said circuit arrangement comprising:
a performance control unit configured to receive said performance indicator and configured to independently control power supply to electrically isolated circuit regions of said integrated circuit based on said performance indicator; and
a monitoring unit configured to check at least a noise level of the controlled power supply, and signal a respective control signal to said performance control means if the checking result is not within a predetermined range, wherein said monitoring unit comprises a power-supply-noise monitor unit configured to check if the noise on the power supply voltage exceeds a predetermined maximum value, wherein said performance control unit is coupled to a voltage control unit configured to control said power supply, wherein said voltage control unit comprises a variable resistor unit and having at least two isolated circuit regions, further comprising a shift register unit coupled to said variable resistor unit and to a clock generator unit configured to supply an adjusted clock signal to said isolated circuit regions wherein said shift register unit is configured to be controlled based on a binary control signal supplied from said performance control unit and wherein said binary control signal defines a binary value shifted into said shift register unit so as to either increase or decrease the performance of said integrated circuit.

2. The circuit arrangement according to claim 1, wherein said monitoring unit further comprises a clock comparing unit configured to compare a first clock pulse with a reference pulse which is synchronous to a clock pulse of a predetermined delay.

3. The circuit arrangement according to claim 2, wherein said monitoring unit further comprises a delay unit configured to delay said first clock pulse by a predetermined time period associated with a worst case path delay.

4. The circuit arrangement according to claim 1 wherein said performance control unit comprises a finite state machine configured to store information about the current system state and configured to control transition to a state corresponding to said received performance indicator.

5. The circuit arrangement according to claim 4, wherein said performance control unit comprises a suppression unit configured to suppress a state transition in response to the receipt of said respective control signal.

6. The circuit arrangement according to claim 1, wherein said performance control unit is configured to operate at nominal power supply and said monitoring unit is configured to operate at said controlled power supply.

7. The circuit arrangement according to claim 6, further comprising a shifting unit configured to shift the level of said respective control signal and configured to supply the level-shifted control signal to said performance monitoring unit.

8. The circuit arrangement according to claim 1, wherein said performance control unit is arranged to control a back-bias voltage of said integrated circuit.

9. The circuit arrangement according to claim 1 having at least two isolated circuit regions wherein said performance control unit is configured to control a bypass means to skip at least one register means of a processing pipeline of said at least two isolated circuit regions.

10. The circuit arrangement according to claim 1, wherein bit values of said shift register unit are used to individually bypass delay sections of said clock generator unit.

11. The circuit arrangement according to claim 1, wherein said performance control unit is configured to select a predetermined profile mode from a plurality of profile modes, each profile mode defining a predetermined relationship between a set of performance parameters of said integrated circuit.

12. The circuit arrangement according to claim 11, wherein said performance parameters comprise a clock frequency, a power supply voltage and a threshold voltage.

13. The circuit arrangement according to claim 11, wherein said predetermined profile mode and said performance parameters are stored in a look-up table.

14. The circuit arrangement according to claim 11, wherein said plurality of profile modes comprise a profile mode in which said power supply voltage and said clock frequency are maintained at a fixed relationship.

15. A method of controlling performance of an integrated circuit in response to a monitored performance indicator, said method comprising:
   independently controlling, by a performance control unit, a power supply to electrically isolated circuit regions of said integrated circuit based on said performance indicator,
   checking at least a noise level of the controlled power supply, and
   feeding back a respective control signal to said controlling step if the checking result is not within a predetermined range,
   wherein independently controlling the power supply comprises supplying an adjusted clock signal to at least two isolated circuit regions and controlling a shift register unit coupled to a variable resistor unit based on a binary control signal supplied from the performance control unit, and wherein said binary control signal defines a binary value shifted into said shift register unit so as to either increase or decrease the performance of the integrated circuit.

16. The method according to claim 15, wherein independently controlling further comprises controlling a back-bias voltage of said integrated circuit.

17. The method according to claim 15, wherein independently controlling further comprises controlling a bypass means to skip at least one register means of a processing pipeline of at least two isolated circuit regions of said integrated circuit.

18. The method according to claim 15, wherein checking comprises comparing a first clock pulse with a reference pulse which is synchronous to a clock pulse of a predetermined delay and delaying the first clock pulse by a predetermined time period associated with a worst case path delay.

19. The method according to claim 15, further comprising storing information about the current system state and controlling a transition to a state corresponding to said received performance indicator.

20. The method according to claim 19, further comprising suppressing a state transition in response to the receipt of said respective control signal.

* * * * *